G. W. BROWN.
Wheel-Cultivator.
No. 29,762.
Patented Aug. 28, 1860.
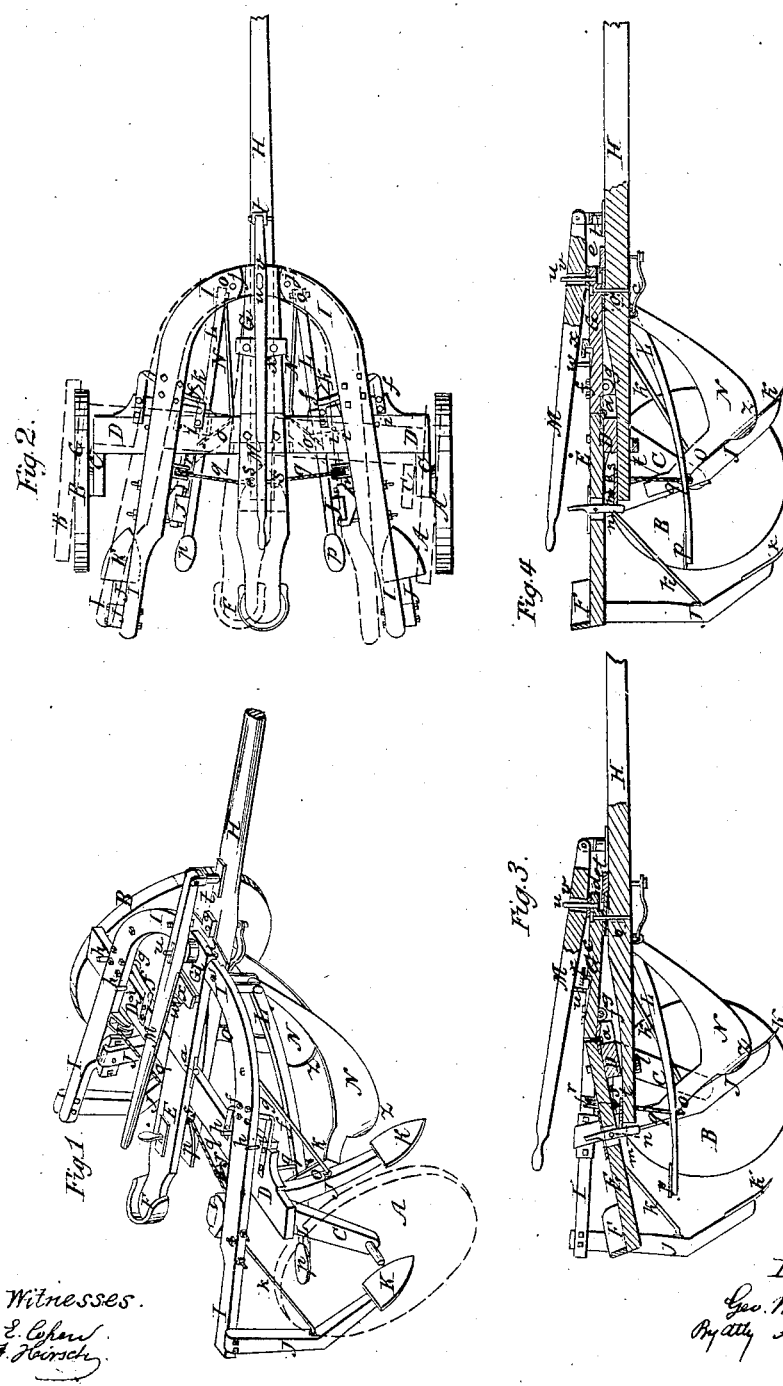

UNITED STATES PATENT OFFICE.

GEORGE W. BROWN, OF GALESBURG, ILLINOIS.

IMPROVEMENT IN CULTIVATORS.

Specification forming part of Letters Patent No. 29,762, dated August 28, 1860.

*To all whom it may concern:*

Be it known that I, GEORGE W. BROWN, of Galesburg, in the county of Knox and State of Illinois, have invented certain new and useful Improvements in Corn Plows or Cultivators; and I do hereby declare the following to be a full, clear, and exact description of the construction and operation of the same, reference being had to the accompanying drawings, making a part of this specification, in which—

Figure 1 represents a perspective view of the plow or cultivator with one wheel removed to show the parts behind it, the position of said wheel, when in place, being shown by red lines. Fig. 2 represents a top plan of the same, and showing by dotted red lines its susceptibility of lateral adjustment. Fig. 3 represents a vertical and longitudinal section through the frame with the several parts in the position they assume when the plows are raised up out of the ground and carried on the wheels. Fig. 4 represents a similar section with the plows let down, and showing the position of the several parts when the plows are so let down and in working position.

Similar letters of reference, where they occur in the several figures, denote like parts of the plow or cultivator in all the drawings.

In the use of corn plows or cultivators upon which the attendant or operator rides it is necessary that certain lateral and vertical adjustments should be under his easy and instantaneous control. The lateral adjustments are for keeping the plows parallel with the rows of plants and making them conform to any and all deviations from a straight line that may occur in said rows of plants, whether they be more or less abrupt, and thus save many plants that would otherwise be thrown out or buried up, and they also enable the operator to shun stones, roots, or other obstructions which may come in the path of the plows. The vertical adjustments are for raising the plows or cultivators up out of the ground when transporting the machine from place to place, or when turning it around at the ends of the rows, or for adjusting the depth at which the plows or shovels shall penetrate the ground, and these adjustments must be simple and easily made, because the attendant or operator, in addition to the management of the plow or cultivator, must manage and direct his team.

My invention has for its object the so constructing of such corn plows or cultivators as carry the attendant or operator upon them as that by his weight and feet mainly he may make all the necessary lateral and vertical adjustments and movements, while his hands are free to manage and direct his team, thus keeping everything within his easy control without leaving his seat or reaching out with his hands or for a moment relinquishing the management of his team, and in so constructing the machine to have due regard to cheapness of structure, strength, durability, and the result to be attained in the cultivation of the plants; and the nature of my invention consists, first, in raising up, holding, or lowering the plows by the position or weight of the driver, operator, or attendant in his seat, as described; second, in the cramping of the axle and wheels with the tongue, in order to cause the plows to follow the crooks in the rows of plants, as described; and, third, the peculiar construction and operation of the convex cutters or shields to prevent the clods from rolling on and knocking down the young plants.

To enable others skilled in the art to make and use my invention, I will proceed to describe the same with reference to the drawings.

In a pair of wheels, A B, is supported by arms C, projecting forward and upward from the hubs or centers of said wheels, an axle, D, to which the several parts of the machine are connected, as will be hereinafter explained. The position of this axle or cross-piece D forward of the centers of the supporting-wheels A B is important, so that it may serve as a lever in connection with the driver's seat and the tongue, the bearings in the wheels being the fulcra in one case and the point of the tongue connected to the necks of the horses the fulcrum in the other case.

The beam E is permanently attached to the axle D and extends rearward therefrom, and has upon its extreme rear end the driver, conductor, or operator's seat F. To the front of this beam E, as at *a*, is hinged another piece, G, which extends forward and is pivoted to the tongue H at *b* by a king-bolt, *c*, or its equivalent.

The two side pieces, I I, of the frame are bolted at their front ends to a plate, *d*, through which plate the bolt *c* passes, so that the whole frame may move around this bolt $c$ as a common center. The plate $d$ moves under a projecting catch-piece, $e$, which is fastened to the tongue H, and this prevents the pieces G I I from rising from the tongue, while they are free to turn on it. These side pieces, I, are curved at their front ends, as shown in the drawings, and are connected to the axle D by hinge-connections, so that they can rock on said axle. These hinged connections I make as follows, though of course others may be used: A bent rod, $f$, is secured to the axle D, one for each piece I, and staples or stirrups $g$ $g$ clasp this bent rod to form the hinge; and for the purpose of spreading out or narrowing the spaces between these side pieces, I I, the bent rods $f$ are made long, and pins $h\ h$, which fit into adjusting-holes $i\ i$ on the axle, are used, so that said side pieces. I, which can swing on their pivots $j$, which connect them to the plate $d$, can be spread apart or brought together and held when in the desired position. To these side pieces, I I, are connected the standards or stocks J J, to which the shovels K K are attached, said standards being braced by stay-rods $k$ to the said side pieces. The heel of the tongue H, after passing through a long staple or guide-plate, $l$, underneath the axle D, has upon its extreme end a plate, $m$, with a notch in it, into which the lower end of the latch lever $n$ takes, and when in the notch makes the tongue stiff or rigid with the frame; but when the latch-lever $n$ is thrown out of the notch in the plate $m$, then the frame can turn or cramp on the tongue.

Toward the front of the side pieces, I I, and underneath them, are pivoted, as at $o\ o$, the treadles L L, which extend rearward, and have upon their extremities foot-supports $p\ p$, conveniently arranged, so that the driver or conductor from his seat F may place his feet upon them. From these treadles L, to which they are fastened by one of their ends, extend ropes, cords, or chains $q$, which pass over pulleys $r\ r$, and are secured by their other ends to the heel of the tongue H, as shown at $s\ s$, so that the driver, by pressing on one of the treadles with his foot and easing up the other foot, can cramp or turn the position of the frame and wheels with regard to the tongue, as shown by the red dotted lines in Fig. 2. These dotted lines, however, only show the parts as thrown on one side of a true line. It obvious that they will go just as far on the opposite side of such right line.

The object of cramping the frame and wheels on the tongue is to cause the plows to follow the crooks in the rows of plants. Before cramping the frame on the tongue the latch-lever $n$ must be drawn out of the notch in plate $m$. This leaves the frame free to move on the tongue in a lateral direction. Though this cramping may be done by the feet of the driver, which leaves his hands free to manage his horses, yet I have added a lever, M, by which this operation may be done in whole or in part, if so desired. The lever M is pivoted to a stud, $t$, on the tongue H, and extends back, so that the driver may readily grasp it from his seat. A pin, $u$, in the front end of the beam G projects up through a slot, $v$, in the lever M. The driver by seizing and operating this lever can throw the frame to the right or left of the line of the tongue or line of draft, and thus cause the frame and wheels and consequently the plows to move out of such line and to make any crooks or turns that may be necessary to cause the plow to follow the rows of plants. To hold the lever M down to its place, an arm, $w$, with a friction-roller upon it, takes under the edge of a plate, $x$, that is fastened to the beam G.

N N are convex cutters and shields. Their front ends are connected at or near the points $o\ o$, and, inclining downward and rearward, they extend back to or a little behind the first pair of plows, and their rear ends are supported by the pieces $o$, that connect them with the standards J of the front pair of plows. The cutters or guards are slightly bent inward toward each other at $z$, so as to leave space enough between them and the plows to allow the fine earth to flow in along the plants through said space, and yet prevent all clods or course material from falling on the plants. The edges of these cutters or shields project upward at a steep inclination, so that they will more readily pass through than ride over any intervening obstacle.

The plows can be, as above stated, set wider apart or closer together without in any manner interfering with the lateral and vertical movement described for cramping the frame on the tongue and for raising the plows up out of the ground. When the driver throws his weight upon the seat F the beam E will go down, as shown in Fig. 3, and by tilting or rocking the axle D raise up the side pieces, I I, and with them the plows K K. When he throws himself forward or bears his weight on the treadles L the plows descend and enter the ground, and by means of the seat and the treadles and his weight he can control the plow to a nicety as to depth as well as to direction.

I am aware that the plows have been skewed on the plow-frame to cause them to follow short crooks, &c.; but this does not answer a good purpose, as the wheels and frame are at a different angle to or in the line of draft. I skew the whole frame, plow, wheels, and all on the tongue, and can thus guide the machine to the right or left with the greatest ease.

The pieces L having been described as treadles, they are of course levers in every sense, operated by the feet of the driver, as much so as the piece M is a lever, which he operates with his hands.

Having thus fully described the nature and object of my invention, what I claim is—

1. So combining the frame, wheels, and plow with the tongue and with the levers L M as that the driver or operator from his seat may turn or cramp said frame, wheels, and plows on the tongue to cause the plows to follow the crooks in the rows of plants, substantially as described.

2. So combining the seat and tongue with the frame and with an axle set in advance of its supports in the wheels as that the driver or operator in his seat by shifting his weight may raise, hold up, and lower the plows, substantially asd escribed.

3. In combination with the plows, the convex cutters or shields N N, when constructed, arranged, and operating as herein set forth.

GEO. W. BROWN.

Witnesses:
P. H. FELLOWS,
F. I. HIBBARD.